US012728744B2

(12) United States Patent
Tröster et al.

(10) Patent No.: US 12,728,744 B2
(45) Date of Patent: Sep. 8, 2026

(54) ELECTRICAL DRIVE SYSTEM FOR A VEHICLE AND METHOD FOR OPERATING A CORRESPONDING ELECTRICAL DRIVE SYSTEM

(71) Applicant: MERCEDES-BENZ GROUP AG, Stuttgart (DE)

(72) Inventors: Nathan Tröster, Stuttgart (DE); Urs Boehme, Ehningen (DE); Markus Orner, Rennigen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 248 days.

(21) Appl. No.: 18/292,404

(22) PCT Filed: Jul. 26, 2022

(86) PCT No.: PCT/EP2022/070915

§ 371 (c)(1),
(2) Date: Jan. 26, 2024

(87) PCT Pub. No.: WO2023/006729

PCT Pub. Date: Feb. 2, 2023

(65) Prior Publication Data

US 2024/0343141 A1 Oct. 17, 2024

(30) Foreign Application Priority Data

Jul. 27, 2021 (DE) ..................... 10 2021 003 852.5

(51) Int. Cl.
*H02P 1/00* (2006.01)
*B60L 53/14* (2019.01)
*B60L 53/24* (2019.01)

(52) U.S. Cl.
CPC ............... *B60L 53/24* (2019.02); *B60L 53/14* (2019.02); *B60L 2210/40* (2013.01)

(58) Field of Classification Search
CPC .. H02P 27/06; H02P 2201/07; H02P 2201/09; B60L 53/24
See application file for complete search history.

(56) References Cited

U.S. PATENT DOCUMENTS 9,231,433 B2 1/2016 Schillinger
10,476,401 B2 11/2019 Kusch et al.
(Continued)

FOREIGN PATENT DOCUMENTS

CN 101278471 A 10/2008
CN 109789805 A 5/2019
(Continued)

OTHER PUBLICATIONS

Office Action dated Sep. 26, 2025 in related/corresponding U.S. Appl. No. 18/292,399.

(Continued)

*Primary Examiner* — Karen Masih
(74) *Attorney, Agent, or Firm* — PATENT PORTFOLIO BUILDERS PLLC

(57) ABSTRACT

An electrical drive system for a vehicle includes an electrical three-phase machine for driving the vehicle, an electrical energy storage device for electrically supplying the electrical three-phase machine during a driving operation of the vehicle, an inverter of the electrical three-phase machine, which inverter is electrically coupled to the electrical energy storage device. The system also includes a charging connection on the vehicle side for electrically coupling the electrical energy storage device to a vehicle-external charging unit. As a function of the inverter, a charge voltage of the charging connection on the vehicle side can be transformed into a supply voltage for charging the electrical energy storage device.

5 Claims, 5 Drawing Sheets

(56) References Cited

U.S. PATENT DOCUMENTS

| | | | |
|---|---|---|---|
| 10,778,114 | B2 | 9/2020 | Lu et al. |
| 11,161,424 | B2 | 11/2021 | Pfeilschifter et al. |
| 11,223,292 | B2 | 1/2022 | Yang et al. |
| 11,241,971 | B2 | 2/2022 | Lee et al. |
| 11,351,875 | B2 | 6/2022 | Chon et al. |
| 11,479,127 | B2 | 10/2022 | Wein et al. |
| 11,667,204 | B2 | 6/2023 | Pfeilschifter et al. |
| 11,772,505 | B2 | 10/2023 | Lee et al. |
| 12,043,141 | B2 | 7/2024 | Heseding et al. |
| 2014/0049215 | A1 | 2/2014 | Fassnacht |
| 2015/0231978 | A1 | 8/2015 | Danner |
| 2019/0106002 | A1 | 4/2019 | Götz et al. |
| 2019/0238062 | A1 | 8/2019 | Lu et al. |
| 2019/0291585 | A1 | 9/2019 | Yang et al. |
| 2019/0305690 | A1 | 10/2019 | Kusch et al. |
| 2019/0359074 | A1 | 11/2019 | Kume et al. |
| 2020/0298722 | A1 | 9/2020 | Smolenaers |
| 2021/0091573 | A1 | 3/2021 | Takamatsu et al. |
| 2021/0091585 | A1 | 3/2021 | Takamatsu et al. |
| 2021/0316624 | A1 | 10/2021 | Stengert |
| 2024/0343141 | A1 | 10/2024 | Tröster et al. |

FOREIGN PATENT DOCUMENTS

| | | | | | |
|---|---|---|---|---|---|
| CN | 112477641 | A | | 3/2021 | |
| CN | 112537213 | A | | 3/2021 | |
| DE | 4107391 | A1 | | 9/1992 | |
| DE | 102009052680 | A1 | | 5/2011 | |
| DE | 102012202764 | A1 | | 8/2013 | |
| DE | 102012209626 | A1 | | 12/2013 | |
| DE | 102016213070 | A1 | | 12/2016 | |
| DE | 102015225574 | A1 | | 6/2017 | |
| DE | 102016218304 | B3 | | 2/2018 | |
| DE | 102016223186 | A1 | | 5/2018 | |
| DE | 102018000488 | A1 | | 7/2018 | |
| DE | 102017211978 | A1 | | 1/2019 | |
| DE | 102018009840 | A1 | | 6/2019 | |
| DE | 102018009848 | A1 | | 6/2019 | |
| DE | 102018207183 | A1 | | 11/2019 | |
| DE | 102018207185 | A1 | | 11/2019 | |
| DE | 102018207188 | A1 | | 11/2019 | |
| DE | 102018120236 | A1 | | 2/2020 | |
| DE | 102018124787 | A1 | | 4/2020 | |
| DE | 102018124789 | A1 | | 4/2020 | |
| DE | 102019005621 | A1 | | 4/2020 | |
| DE | 102019108194 | A1 | | 6/2020 | |
| DE | 102019112959 | A1 | | 6/2020 | |
| DE | 102019217666 | A1 | | 11/2020 | |
| DE | 102019214299 | B3 | | 1/2021 | |
| DE | 102020110747 | A1 | | 2/2021 | |
| DE | 102019216961 | A1 | | 5/2021 | |
| DE | 102019216962 | A1 | | 5/2021 | |
| DE | 102019217354 | A1 | | 5/2021 | |
| EP | 0593472 | B1 | | 4/1995 | |
| EP | 3866295 | A1 | | 8/2021 | |
| JP | 2009254100 | A | | 10/2009 | |
| JP | 2017507635 | A | | 3/2017 | |
| JP | 2019205320 | A | | 11/2019 | |
| JP | 2020018078 | A | | 1/2020 | |
| JP | 2021035202 | A | | 3/2021 | |
| JP | 2021048759 | A | | 3/2021 | |
| JP | 2021052450 | A | | 4/2021 | |
| KR | 20210041779 | A | * | 4/2021 | .......... H02M 1/4225 |
| WO | 2020074390 | A2 | | 4/2020 | |
| WO | 2020248023 | A1 | | 12/2020 | |

OTHER PUBLICATIONS

International Search Report and Written Opinion mailed Nov. 11, 2022 in related/corresponding International Application No. PCT/EP2022/070946.

International Search Report and Written Opinion mailed Nov. 22, 2022 in related/corresponding International Application No. PCT/EP2022/070910.

International Search Report and Written Opinion mailed Nov. 30, 2022 in related/corresponding International Application No. PCT/EP2022/070915.

Office Action created Mar. 1, 2022 in related/corresponding DE Application No. 10 2021 003 883.5.

Search Report created Mar. 1, 2022 in related/corresponding DE Application No. 10 2021 003 852.5.

Search Report created Mar. 1, 2022 in related/corresponding DE Application No. 10 2021 003 882.7.

Office Action dated Mar. 18, 2025 in related/corresponding JP Application No. 2024-503993.

Office Action dated Mar. 11, 2025 in related/corresponding JP Application No. 2024-503992.

Office Action dated Mar. 4, 2025 in related/corresponding JP Application No. 2024-503994.

Office Action dated Apr. 25, 2026 in related/corresponding CN Application No. 202280052697.X.

* cited by examiner 1
4
9
Electrical Energy Storage Device
3
Vehicle-External Charging Unit
6
EMC Filter
8
7
5
2
A
B
C
SF
U_Batt
U_L
Z
C1
C2
S_A1
S_A2
S_A3
S_A4
S_B1
S_B2
S_B3
S_B4
S_C1
S_C2
S_C3
S_C4
D_A1
D_A2
D_A3
D_A4
D_B1
D_B2
D_B3
D_B4
D_C1
D_C2
D_C3
D_C4
D_ZA1
D_ZA2
D_ZB1
D_ZB2
D_ZC1

SF
Electrical Energy Storage Device
3
$U_{Batt}$
SF
1
4
$S_{A1}$
$D_{A1}$
$S_{B1}$
$D_{B1}$
$S_{C1}$
$D_{C1}$
+
$C_1$
-
$D_{ZA1}$
$D_{A2}$
$D_{ZB1}$
$D_{B2}$
$D_{ZC1}$
$D_{C2}$
$S_{A2}$
$S_{B2}$
$S_{C2}$
Z
$S_{A3}$
$S_{B3}$
$S_{C3}$
$D_{ZA2}$
$D_{A3}$
$D_{B3}$
$D_{C3}$
$D_{ZB2}$
+
$C_2$
-
$S_{A4}$
$D_{A4}$
$S_{B4}$
$D_{B4}$
$S_{C4}$
$D_{C4}$
EMC Filter
8
Vehicle-External Charging Unit
6
5
7
B
A
C
2

1
4
SF_G
SF_L

Electrical Energy Storage Device
3
U_Batt
EMC Filter
8
7
5
Vehicle-External Charging Unit
6
A
B
C
2
z
C_1
C_2
S_A1
S_A2
S_A3
S_A4
S_B1
S_B2
S_B3
S_B4
S_C1
S_C2
S_C3
S_C4
D_A1
D_A2
D_A3
D_A4
D_B1
D_B2
D_B3
D_B4
D_C1
D_C2
D_C3
D_C4
D_ZA1
D_ZA2
D_ZB1
D_ZB2
D_ZC1
D_ZC2

ELECTRICAL DRIVE SYSTEM FOR A VEHICLE AND METHOD FOR OPERATING A CORRESPONDING ELECTRICAL DRIVE SYSTEM

BACKGROUND AND SUMMARY OF THE INVENTION

Exemplary embodiments of the invention relate to an electrical drive system for a vehicle, comprising an electrical three-phase machine for driving the vehicle. The electrical drive system also has an electrical energy storage device for supplying the electrical three-phase machine during a driving operation of the vehicle. In addition, the electrical drive system has an inverter of the electrical three-phase machine, which inverter is electrically coupled to the electrical energy storage device. The electrical drive system has a charging connection on the vehicle side for electrically coupling the electrical energy storage device to a vehicle-external charging unit.

In addition, exemplary embodiments of the invention relate to a method for operating an electrical drive system of a vehicle, wherein during a driving operation of the vehicle, an electrical three-phase machine is electrically supplied by means of an electrical energy storage device so that the vehicle is driven by means of the electrical three-phase machine.

Electrically driven, in particular battery-operated, vehicles, such as electric vehicles (BEV), are frequently operated with a battery voltage in the region of 800 volts. However, 800-volt charging pillars are not always available, meaning that such an electric vehicle also has to be charged at 400-volt charging pillars.

Boost converters can be used for this purpose, for example. An additional power electronics unit is installed in the electric vehicle, which adapts the voltage of the charging pillar to the battery voltage of the vehicle.

For example, in the prior art, switching batteries are used, which are divided into two strings that can be connected in parallel or in series with switches. This means that the electric vehicle can be charged with either 400 volts or 800 volts.

For example, a switching arrangement for hybrid and electric vehicles is known from DE 10 2018 009 848 A1. An additional voltage converter by means of which a 400-volt DC voltage can be converted into an 800-volt DC voltage can be integrated into the vehicle. DE 10 2018 009 840 A1 discloses something similar.

Disadvantages of using such additional voltage converters in the prior art are that additional installation space is required in the vehicle, thereby increasing the vehicle weight and, due to the increased weight and larger installation space, in particular, the energy consumption is greater and the costs also increase. Using the switching battery is also disadvantageous because the additional busbars and switches in the battery lead to additional weight, installation space, and increased costs. In particular, when using such voltage converters and/or switching batteries, components in the vehicle that remain active during charging have to be designed to handle a wider voltage range.

Exemplary embodiments of the present invention are directed to using a 400-volt charging pillar to charge an electric vehicle with a voltage level of 800 volts more easily and without additional costs and complexity.

One aspect of the invention relates to an electrical drive system for a vehicle, comprising

- an electrical three-phase machine for driving the vehicle,
- an electrical energy storage device for electrically supplying the electrical three-phase machine during a driving operation of the vehicle,
- an inverter of the electrical three-phase machine, which inverter is electrically coupled to the electrical energy storage device, and
- a charging connection on the vehicle side for electrically coupling the electrical energy storage device to a vehicle-external charging unit, wherein
- as a function of the inverter, a charge voltage of the charging connection on the vehicle side can be transformed into a supply voltage for charging the electrical energy storage device.

By means of the proposed electrical drive system, electrically driven vehicles, in particular electric vehicles, with a voltage level of 800 volts can be charged more easily at 400-volt charging pillars and/or charging units, since there is no additional effort required for the backward compatibility. Consequently, electric vehicles can be operated more efficiently as there is now an easier and improved option for carrying out charging processes at charging pillars with lower voltages.

These advantages can be achieved as a result of the inverter of the electrical three-phase machine of the vehicle-which inverter is already present in the vehicle-having a secondary function in addition to its primary function. The primary function of the inverter is to provide an AC voltage for the three-phase machine. The secondary function is an alternative use of the inverter, for the charging operation of the vehicle, in particular at a 400-volt charging pillar. Consequently, the backward compatibility of the vehicle can be achieved without the use of additional components and/or parts, as the inverter is already present in the vehicle. The alternative use of the inverter, in particular by using the secondary function of the inverter, can save on the costs, weight and installation space of an electric vehicle.

Another aspect of the invention relates to a method for operating an electrical drive system of a vehicle, wherein

- during a driving operation of the vehicle, an electrical three-phase machine is electrically supplied by means of an electrical energy storage device so that the vehicle is driven by means of the electrical three-phase machine, wherein
- for a charging operation of the vehicle, a vehicle-side charging connection of the vehicle is coupled to an inverter of the electrical three-phase machine, wherein
- as a function of the inverter, a charge voltage of the charging connection on the vehicle side is transformed into a supply voltage for charging the electrical energy storage device.

The method makes it easier to charge an 800-volt electric vehicle at 400-volt charging pillar without any additional effort.

In particular, the method just described can be implemented or carried out with an electrical drive system according to the previous aspect or an advantageous embodiment thereof.

Features, advantages and advantageous embodiment of the electrical drive system according to the invention are to be regarded as features, advantages and advantageous embodiments of the method according to the invention, and vice versa. In particular, the method according to the invention can be carried out with the claimed components of the electrical drive system, alone or in operative combination.

Individual exemplary embodiments of one aspect are to be regarded as advantageous exemplary embodiments of the other aspect, and vice versa.

Further advantages, features and details of the invention emerge from the subsequent description of preferred exemplary embodiments and with reference to the drawing(s). The features and feature combinations mentioned above in the description and the features and feature combinations mentioned below in the description of the figures and/or shown alone in the figures can be used not only in the respectively given combination, but also in other combinations or in isolation, without departing from the scope of the invention.

BRIEF DESCRIPTION OF THE DRAWING FIGURES

In the figures, elements having the same function are provided with the same reference signs.

DETAILED DESCRIPTION

Figure 1:
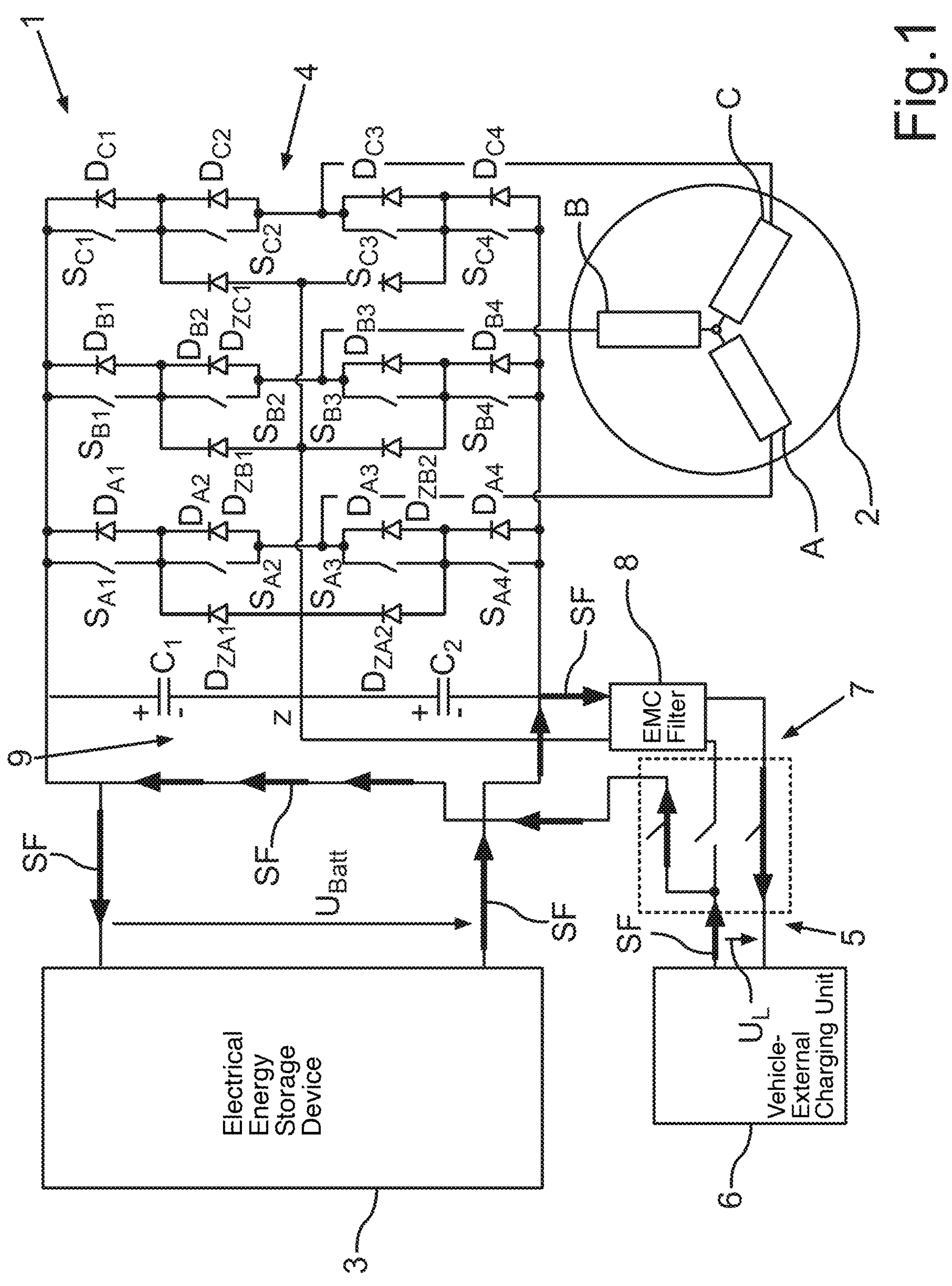
FIG. 1 shows a schematic block circuit diagram of an inventive electrical drive system of a vehicle, in which an 800-volt charging operation of the vehicle is shown.
Figure 5:
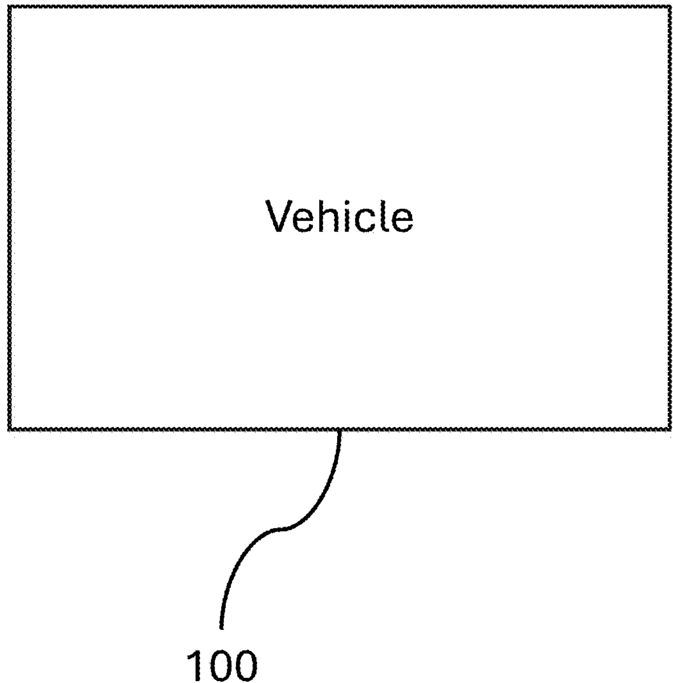
FIG. 5 shows a vehicle.

FIG. 1 shows, for example, a schematic block circuit diagram of an electrical drive system 1 for a vehicle 100 (see FIG. 5). This drive system can be, in particular, an electrical drive system 1 for an electrically driven vehicle, in particular a hybrid vehicle or electric vehicle. The electrical drive system 1 is used, in particular, to propel the vehicle for a journey. Consequently, a multiplicity of components or systems with which the vehicle can be driven can be associated with the electrical drive system 1.

By way of example, the electrical drive system 1 can be called a drive apparatus, switching arrangement or electrical system.

For driving the vehicle, the electrical drive unit 1 can have an electrical three-phase machine 2. In particular, the electrical three-phase machine 2 is an electric machine, in particular an electric motor. The electrical three-phase machine 2 has, in particular exactly, three phases A, B and C. In particular, the electrical three-phase machine 2 can be operated, for example, in motorized operation and thus as an electric motor. In order to operate the electrical three-phase machine 2 in motorized operation, the electrical three-phase machine 2 can be supplied with an electrical AC voltage via the phases A, B and C, in particular with a high-voltage alternating electrical current, in particular via phase lines or phase connections assigned to the phases A, B and C. The phases A, B and C of the electrical three-phase machine 2 can be connected in particular via a by means of a neutral point.

In order to be able to supply the electrical three-phase machine 2 with an AC voltage, the electrical drive system 1 can have an electrical energy storage device 3. Using the electrical energy storage device 3, on the one hand the electrical three-phase machine 2 other vehicle components and/or vehicle systems can be supplied with electrical energy.

By way of example, the electrical energy storage device 3 can be a plurality of batteries or battery systems. In particular, the electrical energy storage device 3 is a battery, in particular a vehicle battery. For example, the electrical energy storage device 3 is a high-voltage battery.

The electrical energy storage device 3 can be used, in particular, to provide a battery voltage $U_{Batt}$. In particular, the vehicle is a battery-operated vehicle with a voltage level of 800 volts. The battery voltage $U_{Batt}$ can be used to provide a voltage value of essentially 800 volts BC.

An AC voltage is needed in order to be able to operate the electrical three-phase machine 2. This AC voltage can be provided or generated by means of an inverter 4 of the electrical three-phase machine 2 by transforming the battery voltage $U_{Batt}$. The inverter 4 can be, for example, a converter or a power inverter. The inverter 4 can be referred to, in particular, as a drive inverter. In particular, the primary function or main function of the inverter 4 is to provide the AC voltage for the electrical three-phase machine 2.

For example, the inverter 4 can be connected between the electrical energy storage device 3 and the electrical three-phase machine 2.

In order in particular to be able to charge the electrical energy storage device 3, the electrical drive system 1 can have a charging connection, in particular a charging connection 5 on the vehicle side. The charging connection 5 on the vehicle side can be, for example, a vehicle charging socket. The vehicle, in particular the electrical energy storage device 3, can be electrically connected to a vehicle-external charging unit 6 using the charging connection 5 on the vehicle side. The charging unit 6 can be, for example, a charging infrastructure, a charging system, a charging station or a charging pillar.

A voltage with a voltage value of 400 volts or 800 volts, for example, can be provided by means of the charging unit 6. In particular, the charging unit 6 can provide any voltage value.

If the vehicle is an 800-volt electric vehicle, a charging facility with a charge voltage of 800 volts is also specifically required. If the charging unit 6 now provides a charge voltage of essentially 800 volts, the charging unit 6 can be connected directly to the electrical energy storage device 3 so that the electrical energy storage device 3 can be charged directly with a voltage having a voltage value of 800 volts via the charging unit 6. For example, for this purpose, the electrical drive system 1 can have a switching device 7. In particular, the switching device 7 is arranged directly on the charging connection 5 on the vehicle side. This switching device 7 can be switched or charged between different switching positions or switching states.

For the case just described of providing a voltage value of 800 volts by means of the charging unit 6, the switching device 7 can be brought into a first switching position. In the first switching position of the switching device 7, the charging connection 5 on the vehicle side, in particular the charging unit 6, is connected directly to the electrical energy storage device 3 so that the voltage of the charging unit 6 can be used without having to be transformed, in order to charge the electrical energy storage device 3. To that end, the switching device 7 can have, for example, switching elements so that there is a direct flow of current from the charging unit 6 to the electrical energy storage device 3. For example, the switching device 7 can have charging contactors, in particular DC charging contactors, for this purpose.

In FIG. 1, the current flow arrows SF visually show the current direction or the current flow when the electrical energy storage device 3 is being charged directly using the charging unit 6, for example with a voltage value of essentially 800 volts.

For example, the switching device 7 can have at least one EMC filter 8 or a plurality of filter units. The EMC filter 8 can be used in particular to protect the vehicle-external charging unit 6 from interference, such as electromagnetic interference.

If the charging unit 6 is used to provide a voltage with a voltage value of 400 volts, in particular less than 800 volts, there is the problem that, as in the prior art, additional voltage converters are required to step up this voltage, which is lower than the battery voltage lower voltage.

To remedy this, the inverter 4 can also have a secondary function in addition to its primary function. In other words, an alternative use of the inverter 4 of the electrical three-phase machine 2 is for the charging of the electrical energy storage device 3. Consequently, the inverter 4 has an additional functionality. For this case, the inverter 4 can be actuated so that it can be used for charging the electrical energy storage device 3. For this case, the inverter 4 can be actuated or operated in such a way that the inverter 4 operates or functions as a boost converter or step-up converter. Consequently, the inverter 4 can be used to transform or step-up the charge voltage $U_L$ of the charging connection 5 on the vehicle side into a higher supply voltage for charging the electrical energy storage device 3. Consequently, the inverter 4 can be used to convert the charge voltage $U_L$, which in this case is 400 volts, into a supply voltage with a voltage value of essentially 800 volts. Thus, even if the charging unit 6 provides a charge voltage L that is too low, it can be transformed into a higher supply voltage for charging the electrical energy storage device 3 and provided without additional voltage converter elements. In particular, when charging the vehicle with 400 volts, the inverter 4 can be used as a step-up converter in order to adjust this 400-volt voltage of the charging unit 6 to the 800-volt voltage of the electrical energy storage device 3.

To achieve this backward compatibility, the inverter 4 can be designed as a 3-level inverter, an S3 inverter or as a 3-stage inverter of T-type design. In particular, the inverter 4 can be designed as a 3-level inverter in NPC (Neutral Point Clamped) topology or as a 3-point inverter in an NPC circuit. In particular, the inverter 4 is a neutral point clamped 3-level inverter. This has a considerably higher dielectric strength than the conventionally used 2-level inverter.

The inverter 4 can freely have switching arrangements for each of the phases A, B and C. In this case, the inverter 4 can have individual semiconductor switches, such as IGBTs or MOSFETs: SA1, SA2, SA3, SA4, SB1, SB2, SB3, SB4, SC1, SC2, SC3 and SC4. The inverter 4 also has a plurality of diodes DA1, DA2, DA3, DA4, DZA1, DZA2, DB1, DB2, DB3, DB4, DZB1, DZB2, DC1, DC2, DC3, DC4, DZC1 and DZC2. Furthermore, the inverter 4 has an intermediate circuit 9, this intermediate circuit 9 can have for example a capacitor C1 and C2, which can be connected via a center tap Z to the charging connection 5 on the vehicle side.

The voltages mentioned, in particular the high-voltage voltages, are understood in general to mean an electrical voltage that is greater than 50 volts, in particular greater than 60 volts. Preferably, the voltages, in particular the high-voltage voltages, are several hundred volts.

The term "essentially" is to be understood, in particular, to mean a tolerance of plus/minus 5 percent, in particular 10 percent.

Figure 2:
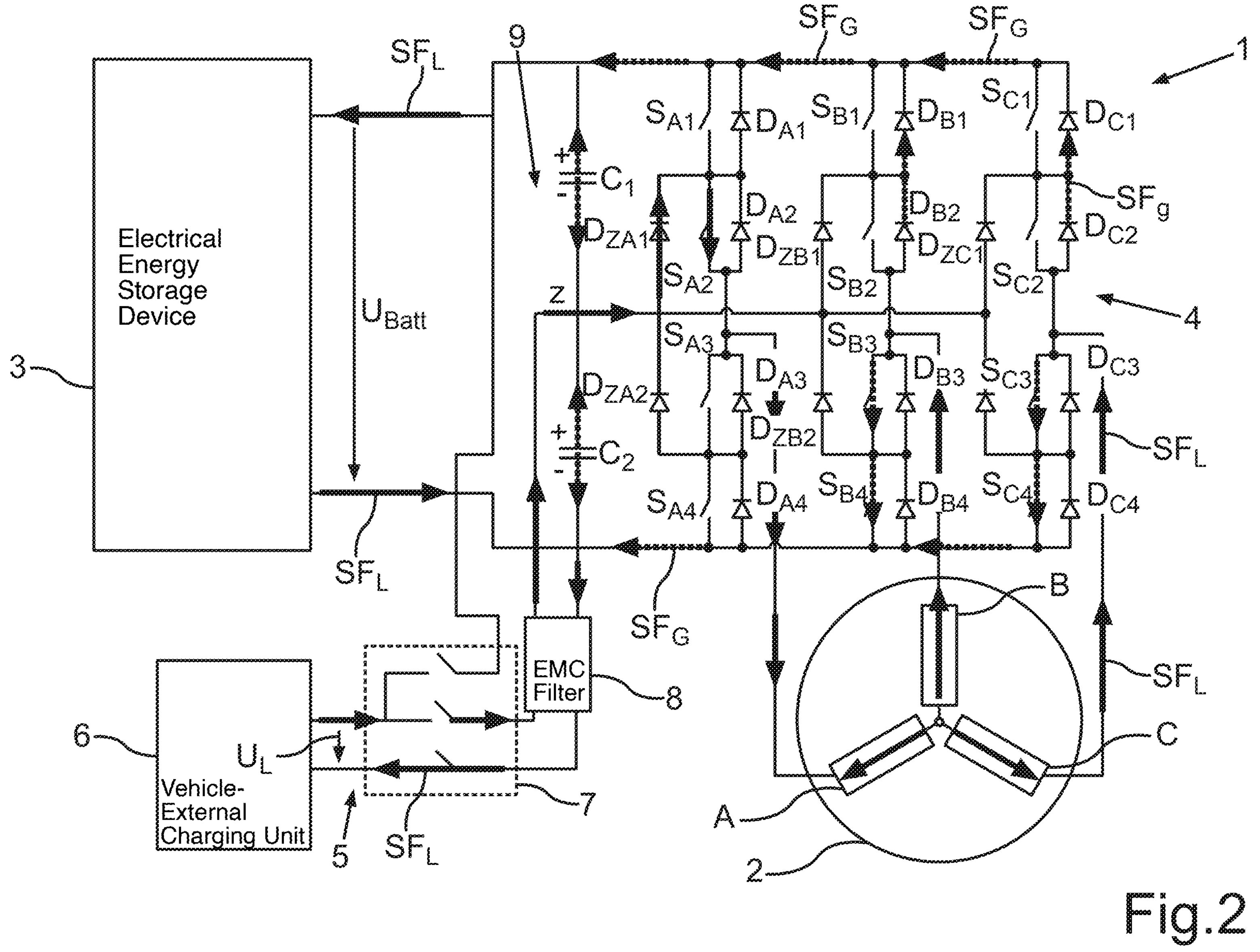
FIG. 2 shows a further schematic block circuit diagram of the electrical drive system from FIG. 1, in which a 400-volt charging operation of the vehicle is shown.

FIG. 2 below now shows the electrical drive system 1 during a charging process at the charging unit 6 with a charge voltage $U_L$ with a voltage value of 400 volts. In this case, the switching device 7 is switched or changed into a second switching position that is different from the first switching position. This change can be performed automatically, in particular, with the aid of a control unit. Firstly, FIG. 2 shows the current flow $SF_L$. This shows, for example, the current flow for the charging using the charge voltage $U_L$ of 400 volts. In this case, the 400 volts of the charging unit 6 can be stepped up, in particular to 800 volts, by means of the inverter 4. To make this possible, individual semiconductor elements of the inverter 4 are operated in clocked mode. For example, the components can be actuated alternately between the current-supplying mode and the clocked mode. In this case, the clocked mode of the individual components is also shown using the current flow arrow $SF_G$. As an example, the semiconductor element SA2 is located in the current flow $SF_L$ in this embodiment. For example, the elements SB3 and SB4 are used as clock generators. By dividing the clocked and non-clocked components, the semiconductor and/or diodes of the inverter 4 can be loaded differently. This reduces the load on the inverter 4.

In particular, inductances of the electrical three-phase machine 2 are used to step up the voltage, meaning that no additional components and/or large and heavy chokes are required.

Figure 3:
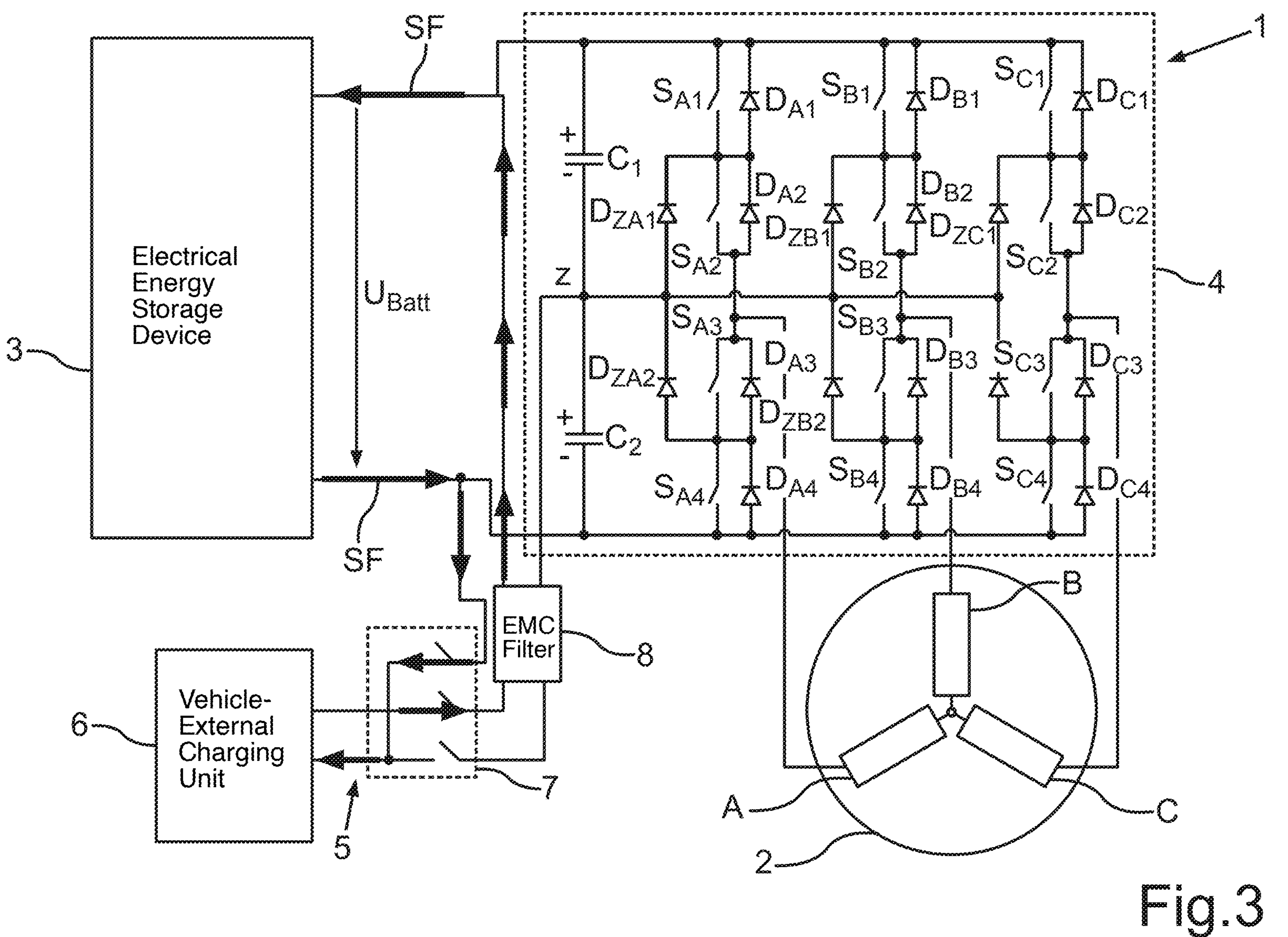
FIG. 3 shows a further exemplary embodiment of the electrical drive system from FIG. 1.
Figure 4:
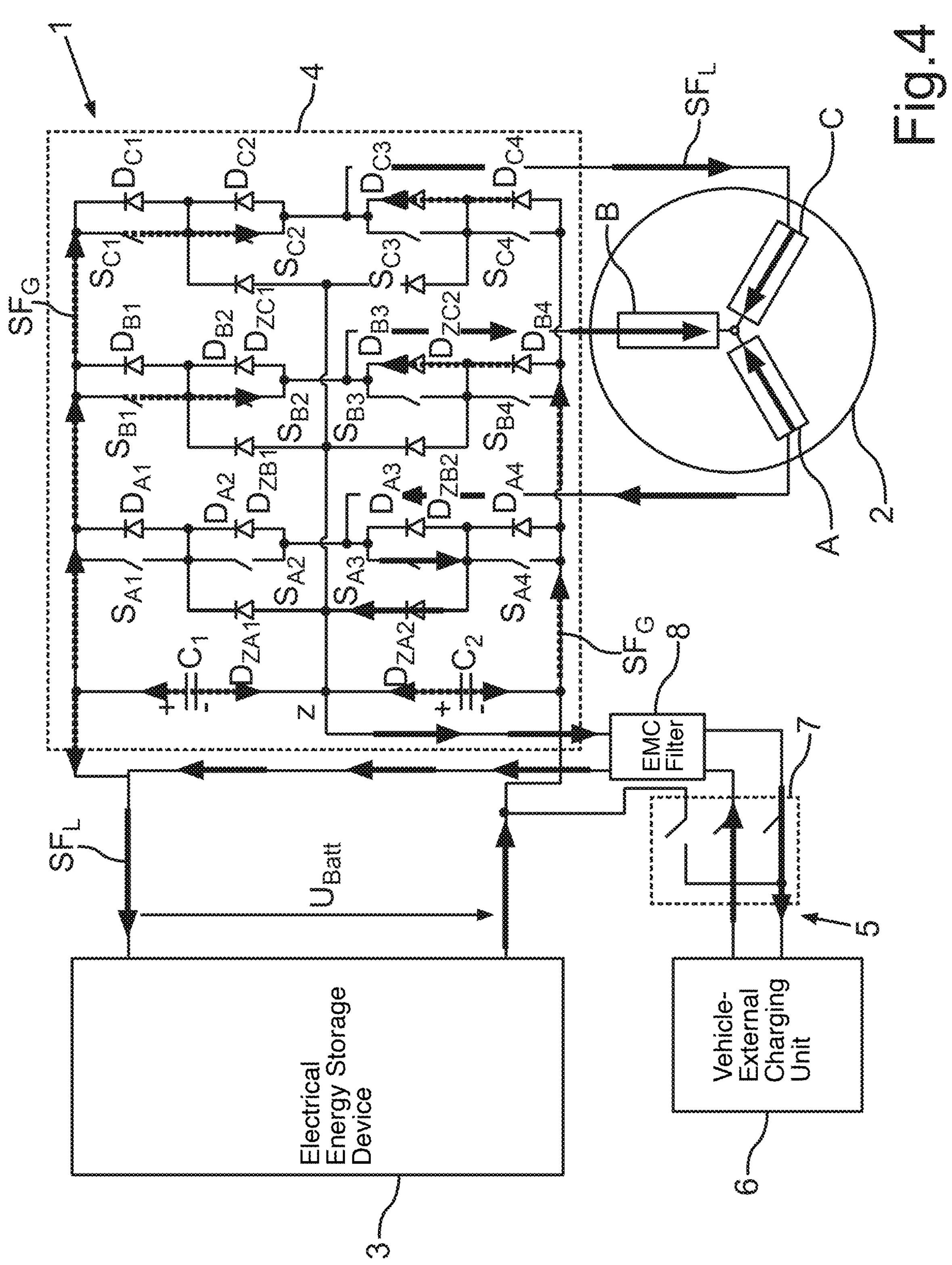
FIG. 4 shows a further exemplary embodiment of the electrical drive system from FIG. 2.

FIG. 3 and FIG. 4 firstly show a somewhat different way of connecting the charging connection 5 on the vehicle side with the electrical energy storage device 3.

In particular, as is shown in FIG. 1, FIG. 3 similarly shows the case of the 800-volt charging. The explanations given for FIG. 1 can also be considered in the same way for FIG. 3.

FIG. 4 shows the same change to the circuitry as in FIG. 3. In particular, the explanations given for FIGS. 2 and 1 can be considered for FIG. 4.

In FIG. 4, the components of the inverter 4 and in particular of the electrical drive system 2 have now been changed in current flow mode and in clocked mode. In particular, a wide variety of permutations with regard to the current-flowing mode of the components and the clocked mode of the components are possible. Therefore, the current flow $SF_L$ also represents the current-conducting components and the current flow $SF_G$ represents the clocking components.

LIST OF REFERENCE SIGNS

- 1 electrical drive system
- 2 electrical three-phase machine
- 3 electrical energy storage device
- 4 inverter
- 5 charging connection on the vehicle side
- 6 vehicle-external charging unit
- 7 switching device
- 8 EMC filter
- 9 intermediate circuit
- A, B, C phases of the three-phase machine
- DA1, DA2, DA3, DA4, diodes DZA1, DZA2, DB1, DB2, DB3, DB4, DZB1, DZB2, DC1, DC2, DC3, DC4, DZC1, DZC2
- SA1, SA2, SA3, SA4, SB1, semiconductor elements SB2, SB3, SB4, SC1, SC2, SC3, SC4
- SF current flow arrows
- $SF_L$ current flow arrows of the charging operation
- $SF_G$ Current flow arrows of the clocked operation
- C1, C2 capacitors Z center tap
$U_L$ charge voltage
$U_{Batt}$ battery voltage

The invention claimed is:

1. An electrical drive system for a vehicle, the electrical drive system comprising:

an electrical three-phase machine configured to drive the vehicle;

an electrical energy storage device configured to electrically supply the electrical three-phase machine during a driving operation of the vehicle;

an inverter electrically coupled to the electrical energy storage device, wherein the inverter is a component of the electrical three-phase machine, and wherein the inverter is a 3-level inverter;

a charging connection on a vehicle side configured to electrically couple the electrical energy storage device to a vehicle-external charging unit; and a switching device configured to electrically couple the charging connection on the vehicle side to the inverter of the electrical three-phase machine to charge the vehicle, wherein the switching device has an electromagnetic compatibility (EMC) filter configured to protect the vehicle-external charging unit from interference, wherein the switching device is configured to directly connect, via the EMC filter, one phase of the charging connection on the vehicle side to a center tap of the inverter, and wherein the inverter is configured to transform a charge voltage of the charging connection on the vehicle side into a supply voltage for charging the electrical energy storage device.

2. The electrical drive system of claim 1, wherein, in the charging operation of the vehicle, the inverter is a boost converter.

3. The electrical drive system of claim 1, wherein in a first switching position of the switching device, the charging connection on the vehicle side is connected directly to the electrical energy storage device, and in a second switching position of the switching device, the charging connection on the vehicle side is connected to the inverter.

4. A method for operating an electrical drive system of a vehicle, the method comprising:

electrically supplying, during a driving operation of the vehicle, an electrical three-phase machine by an electrical energy storage device so that the vehicle is driven by the electrical three-phase machine; and coupling, during a charging operation of the vehicle, a vehicle-side charging connection of the vehicle to an inverter of the electrical three-phase machine, wherein a charge voltage of the charging connection on the vehicle side is transformed by the inverter into a supply voltage for charging the electrical energy storage devices, wherein the inverter of the electrical three-phase machine is a 3-level inverter, wherein the electrical drive system has a switching device, by which the charging connection on the vehicle side is coupled to the inverter of the electrical three-phase machine for the charging operation of the vehicle, wherein the switching device has an electromagnetic compatibility (EMC) filter via which the vehicle-external charging unit is protected from interference, and wherein the switching device is configured to directly connect, via the EMC filter, one phase of the charging connection on the vehicle side to a center tap of the inverter.

5. The electric drive system of claim 1, wherein the switching device is configured to connect another phase of the charging connection on the vehicle side directly to the electrical energy storage device.

* * * * *